April 4, 1944.  J. F. CARLONI  2,345,657
AUTOMOBILE RECORDER
Filed Dec. 31, 1941  2 Sheets-Sheet 1
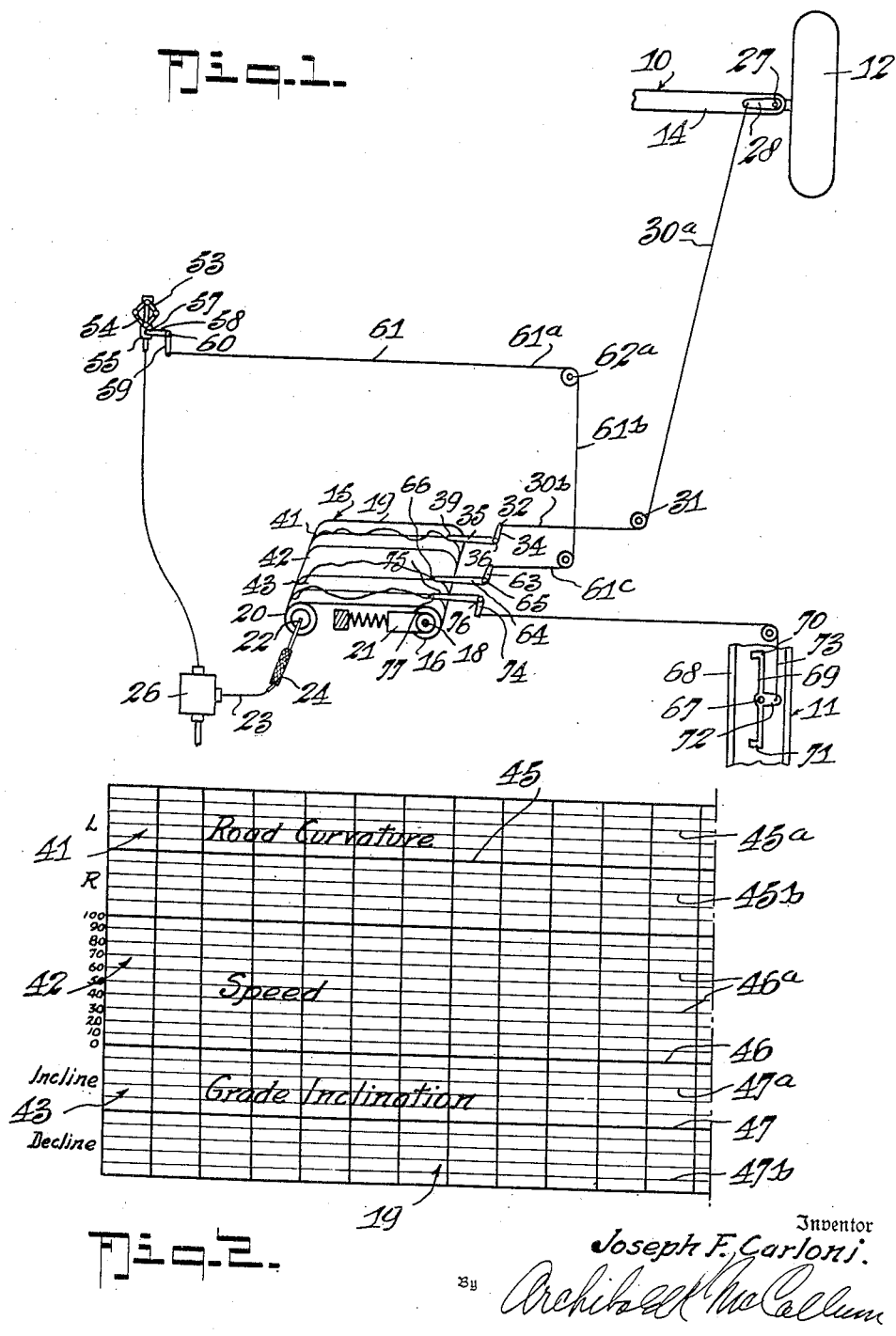

April 4, 1944.                J. F. CARLONI                2,345,657
                            AUTOMOBILE RECORDER
                           Filed Dec. 31, 1941          2 Sheets-Sheet 2
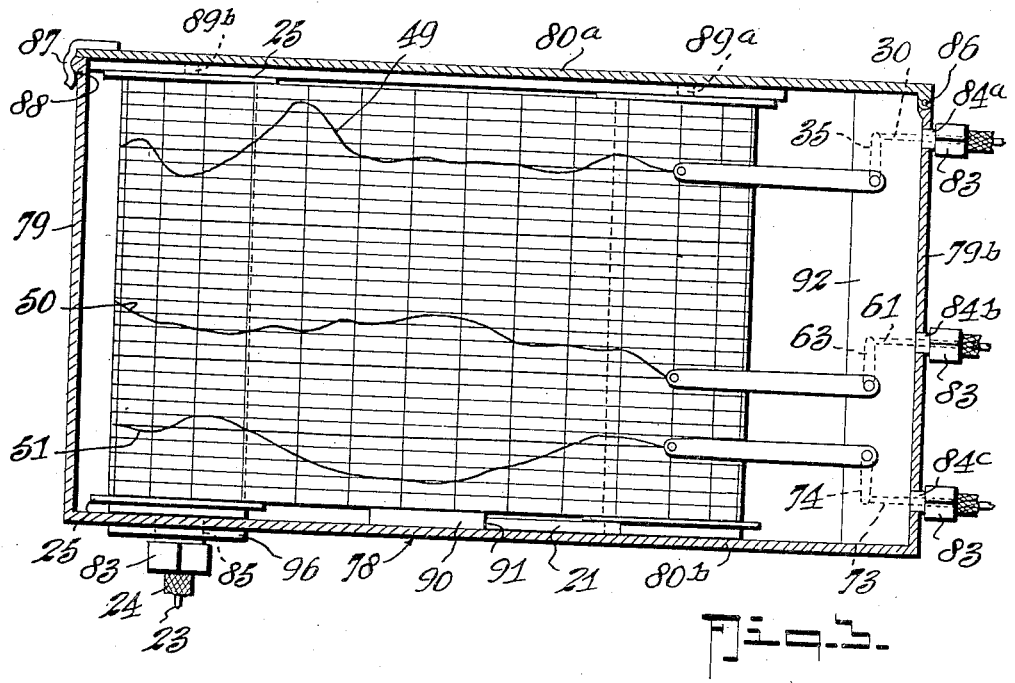
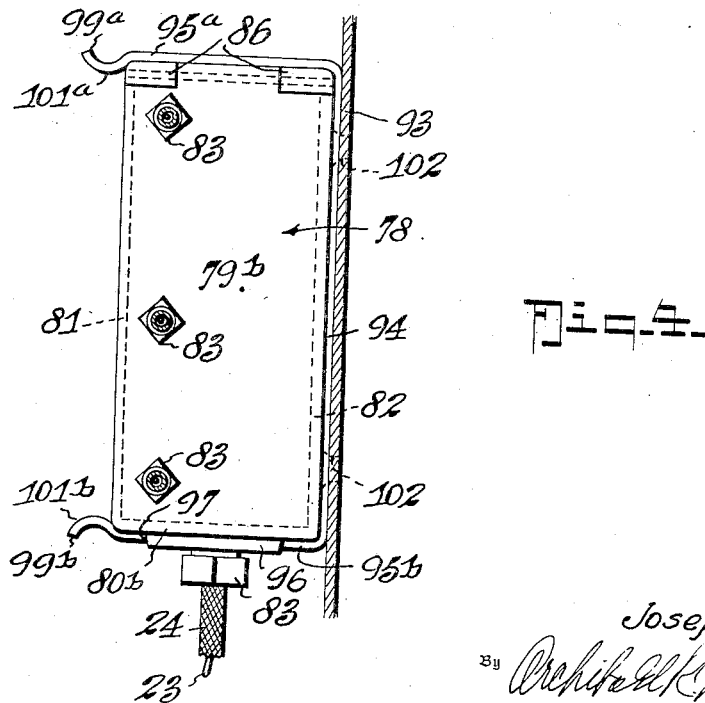
Inventor
Joseph F. Carloni
By
Attorney Patented Apr. 4, 1944

2,345,657

UNITED STATES PATENT OFFICE 2,345,657

AUTOMOBILE RECORDER

Joseph F. Carloni, Harrisburg, Pa.

Application December 31, 1941, Serial No. 425,220

1 Claim. (Cl. 234—1)

This invention relates to recorders for automobiles and more particularly to compound recorders carried by the automobile frame.

In the control of automobile traffic it is frequently essential to determine the degree of care exercised by a driver, and substantial advantages accrue if the physical conditions pertaining at the time of an accident appear on a chart available for subsequent inspection. Various attempts have been made heretofore to record the operations of railroad engineers and vehicle operators generally, but peculiar problems incident to construction and operation of private vehicles presents design aspects relating to compactness, reliability, lightness and styling calling forth ingenuity of a high order in solutions.

Accordingly it is an object of the present invention to provide an automobile frame including a device for recording operating conditions continuously, such recording apparatus being actuated indirectly by the engine of the automobile but disposed for visual concealment and ready access in the event of need.

Another object of the invention is to provide an automobile frame with recording devices which will be simple, economical and reliable in their maintenance during long periods of driving of the car.

Another object of the invention is to provide an automobile driving characteristics recording device which is simple and strong in construction and which will be conveniently available for inspection at any time, and even after its automotive support has been destroyed.

The invention is shown in the following drawings wherein Fig. 1 is a schematic view in perspective and showing a convenient lay-out for the recorder elements and installation in the automobile;

Fig. 2 is a plan view of a chart for use in the device of Fig. 1;

Fig. 3 is a sectional view of the recorder in its protecting casing; and

Fig. 4 is an end view showing the mounting of said frame and recording device.

Fig. 1 includes a typical installation on an automobile 10 having a horizontal frame element 11 forming part of a chassis carried on four wheels (not shown). The right front wheel 12 is rotatable with respect to pivoted front axle 14 suitably connected to any conventional steering mechanism in common use on automobiles.

In one form, recording unit 15 includes a supply roller 16 having a shaft 18 for providing moving chart 19 for delivery on take-up roller 20, brake 21 preferably being utilized against roller 16 to insure that chart 19 is normally taut in passing from roller 16 to roller 20. Roller 20 has shaft 22 driven by flexible drive shaft 23 connected with cabled drive 24, rollers 16 and 20 having opposed flanges 25—25 for insuring even take-up of chart 19. Shaft 23 is driven from transmission 26, for example, in a manner suitable to flexible take-offs for speedometers.

Pivot pin 27 on axle 14 is carried by bracket 28 fixed to the axle, receiving a slide wire having a portion 30a attached and interconnected portion 30b passing over guide 31 and connected to pin 32 on arm 34 of a bell crank pivoted to the inside of the recording unit at 36. The other arm 35 of the bell crank is provided with ink-point or stylus 39 which overlies curvature section 41 of chart 19.

It will be understood that chart 19 includes, in addition to curvature section 41 a speed section 42 and a grade section 43; sections 41 and 42 and 43 thus respectively recording corresponding conditions of the road bed coincidentally. In particular, by referring to Fig. 2, it will be noted that curvature section 41 has a base line 45 and quantitative lines 45a and 45b respectively on opposite sides of the base line. Speed section 42 is provided with base line 46 and successive quantitative lines 46a parallel therewith. Grade section base line 47 at each side is provided with parallel quantitative lines 47a and 47b which indicate the inclination and declination of the road bed, respectively. Referring to Fig. 3, in operation curvature section 41 will be characterized by curvature record 49 indicating a turning to the left when in one portion, and a turning to the right when in the other portion. Speed section 42 has imparted a record line 50 indicative of miles per hour speed rating. Grade section 43 receives a record line 51 indicating, when in one portion, the inclination and, when in the other portion, the declination of the road.

In order that the records of chart 19 may be accurately correlated with the forward motion of automobile and frame 11 conventional speedometer governor 53 on governor shaft 54 carries on its collar 55 pin 57. Bell crank arm 58 is pivotally connected to pin 57, the other arm 59 pivotally carrying slide wire 61 comprising portions 61a, 61b and 61c. Bell crank 58 is pivoted at 60 and as the governor 53 causes pin 57 to move bell crank 58 is rotated to cause wire 61 to move longitudinally on guide 62a. Portion 61c is pivotally connected to bell crank arm 63, the other arm 64 being pivoted at 65 at one end and carrying ink-point or stylus 66 at the other end. In this alignment speedometer changes are positively recorded on speed section 42, movement of wire 61 causing ink-point 66 to swing with respect to base line 46 accurately to indicate the speed of the automobile.

In order to provide a record of the grade inclination of the road bed being traveled by the automobile a pivot 67 on a horizontal longitudinal frame member 68 supports at its midpoint beam 69 held normally in the horizontal longitudinal by equal terminal weights 70 and 71. Extending upwardly from beam 69 is preferably integral finger 72 to which is pivotally connected one end of the slide wire 73. The other end is pivotally connected with one arm 74 of a bell crank having its other arm 75 pivotally mounted at 76 and carrying at its extremity ink-point or stylus 77. From the foregoing it will be observed that when the automobile is proceeding on an upward grade the pivot balance 69 on longitudinal frame member 68 will swing relatively in a counter-clockwise direction as shown in Fig. 1, the extent of such swinging being recorded on the stylus end of bell crank arm 75 by proper line record above the base line in section 43 of chart 19. Conversely, when the automobile proceeds down hill longitudinal frame 68 will incline downwardly, causing the beam 69 to rotate in a clockwise direction, thus actuating slide wire 73 to rotate bell crank 75 oppositely and record the declination quantitatively below base line 47.

Particularly referring to Figs. 3 and 4 it will be observed that the recording mechanism described hereinabove is enclosed within a protective casing safely attached to the frame of the car to ensure that in the event of accident the record, up to the time of accident will be preserved even though the automobile itself be demolished. Unit 15 is provided with a casing 78 including end walls 79 and 79b, and side walls 80a and 80b, connecting forward wall 81 and rearward wall 82. End wall 79b is perforated to receive bushings 84a, 84b and 84c, and side wall 80b is perforated to receive a bushing 85. Referring to Fig. 3 it will be observed that the bushings in 79b (84a, 84b and 84c), provide bearings for slide wires 30, 61 and 73, while bushing 85 provides bearing support for flexible drive shaft 23. Fittings 83 are provided at each bushing for anchoring the cabled extremities for the slide wires and shaft.

Hinges 86—86 pivotally connect end wall 79b and side wall 80a, the latter having a clasp 87 on its opposite end for closing the unit casing tightly upon engagement in notch 88. A plate carried on the inner surface of side wall 80a is recessed at 89a and 89b to receive the extremities of the supply and take-up roller shafts. A bearing plate 90 carried by side wall 80b supports shoulder 91 for brake 21. A bearing web 92 on the inner surface of end wall 79b fixedly supports the pivots for the bell cranks 35, 63 and 74. The assembly thus described is sturdy and close fitting as to tolerances, in order to ensure that the unit will be well protected under rough operating conditions, and the internal parts thereof preferably hermetically sealed against the elements.

Fixed to bottom 93 (Fig. 4) of the car, on the lower surface thereof is a spring clamp 94 consisting of a substantially U-shaped bracket having arms 95a and 95b extending at right angles from the car bottom. A boss 96 on side wall 80b is provided for centering the unit and locking the same in the spring clamp 94, recess 97 being formed in an arm 95b for snugly accommodating boss 96.

Arms 95a and 95b of the clamp have outwardly concave extremities 99a and 99b with lugs 101a and 101b springing in the plane of casing 78 and retaining same therein against accidental dislocation by jolting. Spring clamp 94 may be fastened to the bottom of the car by any means such as screws 102, 102.

From the foregoing it will be observed that the device is self-protecting in that its casing insures against damage by the elements and against breakage or destruction of the record contents in the event of collision. While the spring clamp support is flexible to permit convenient installation or removal of the casing therefrom by means of a screw driver or other prying implement, the spring clamp is yet sufficiently strong as to firmly retain the unit in recording position under all ordinary shocks and jolts. As an important feature of the invention, the mechanism is mounted externally of the car in order to insure that in the event of severe shock of collision the unit will be jolted from the frame and the unit and contents thereby saved against crushing with portions of the automobile body. The special frame mounting is additionally advantageous in rendering the unit conveniently accessible for installation, repair or replacement, while at the same time concealing same from view and obviating necessity for any re-design of the automobile body for its accommodation.

In the construction described the driving conditions characterizing any particular time will be recorded and the record will be readily available for future reference for the purpose of evidence of habits of the driver over previous periods of time, as well as conditions obtaining at any moment of collision. Not only will the device register the speed of a car, but it will indicate contributing factors such as whether the driver passed another car on the crest of a hill or under similarly dangerous conditions.

In one utilization of the construction, by requiring licensed vehicles to carry such recording unit, traffic authorities will be able readily and exactly to re-construct the essential driving conditions right up to the moment of an accident. Conversely, the licensed driver will be educated to careful driving since he would realize that his driving methods were constantly being recorded with exactitude. In the event traffic control authorities required periodic inspection of the present recording unit quick and easy access thereto is rendered available by the spring clamp 94 and associated elements.

The unit may be readily replaced by disconnecting the flexible cables at the bushings, and making new slide rod connections upon installation of a new unit.

I claim:

In combination with an auto frame, a casing, a recording apparatus within said casing, said recording apparatus recording the driving characteristics of the automobile, and fastening means to secure said casing to the automobile, said fastening means including a resilient element on the exterior of the auto frame which supports said casing under driving conditions but which is effective to release the casing under severe jolts of collision order.

JOSEPH F. CARLONI.